(No Model.)
A. MUNGER.
GATE HANGER.
No. 542,937. Patented July 16, 1895.
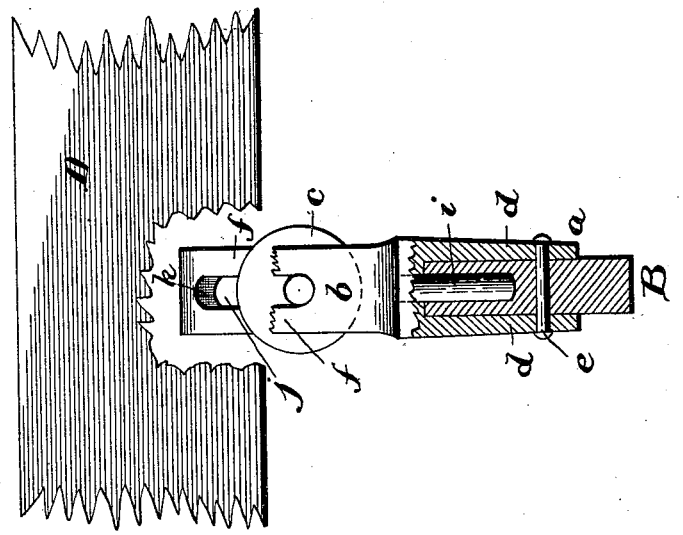
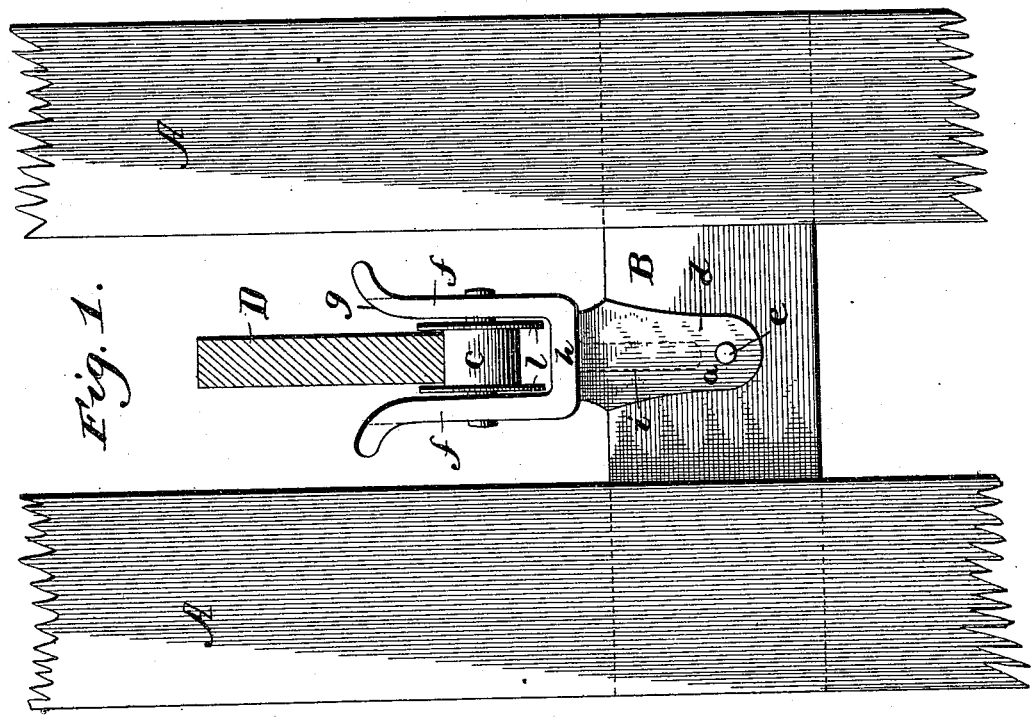

UNITED STATES PATENT OFFICE.

ANDREW MUNGER, OF EVANSVILLE, WISCONSIN.

GATE-HANGER.

SPECIFICATION forming part of Letters Patent No. 542,937, dated July 16, 1895.

Application filed July 5, 1894. Serial No. 516,641. (No model.)

*To all whom it may concern:*

Be it known that I, ANDREW MUNGER, a citizen of the United States, residing at Evansville, in the county of Rock and State of Wisconsin, have invented certain new and useful Improvements in Gate-Hangers; and I do hereby declare the following to be a full, clear, and exact description of the invention, which will enable others skilled in the art to which it appertains to make and use the same.

My invention relates to various new and useful improvements in gate-hangers which are particularly intended for use in connection with farm-gates.

My improved gate-hanger is of a well-known type now in common use in this country. By its use the gate on which it is hung may be rolled more or less to one side, partially to disclose the opening for the passage of stock, cattle, &c., or be swung entirely open, with or without being first rolled back to a balance, to permit of the passage of teams, agricultural machines, &c.

The particular object I have in view is to produce a gate-hanger which can be constructed and erected at low cost, and which will be durable and effective in operation.

For a better comprehension of my invention attention is directed to the accompanying drawings, forming part of this specification, in which—

Figure 1 is a front elevation of my improved gate-hanger, illustrating the method of its application and showing in section the lower bar or slat of the gate; and Fig. 2, a side elevation, partially in section, of the same elements, a portion of the hanger and of the gate being broken away for purposes of better illustration.

In all of the above views corresponding parts are represented by the same letters of reference.

It may be mentioned in the first place that I prefer to use my improvement in connection with a gate, and preferably the fence also, made of a series of parallel horizontal slats secured together in any suitable way, yet at the same time I do not wish to be limited thereto. Having provided a gate, by preference, of this character, I firmly embed in the ground the usual parallel uprights A A, connected together near the lower end by a cross-piece B, a similar cross-piece (not shown) being generally provided at or near the top of said uprights in order to strengthen the same. These uprights are spaced far enough apart to allow the gate to travel freely between them, and they are mounted, as heretofore, near the rear end of the gate and on a line at an angle to the same, so as to enable the gate to be swung entirely open. So far as the arrangement of these uprights is concerned I make no claim thereto, since all gate-hangers of the type of my invention are used in connection with similarly-arranged uprights.

Referring now specifically to my improvement, it will be seen that it consists essentially of three parts—namely, a base $a$, a pivotal body portion $b$, swinging on said base, and a roller $c$, mounted in the body portion and sustaining the gate.

The base $a$ is preferably cast in one piece, and is provided with two flat legs $d$ $d$ to pass one on each side of the cross-piece B. A rivet or bolt $e$ is passed through both legs and the said cross-piece, thereby holding the base $a$ firmly in place. The upper surface of the base constitutes a flat shoulder, upon which the weight of the gate is supported.

The body portion $b$ of my improved gate-hanger is also cast by preference in one piece, and is provided with two forked arms $f$ $f$, curved outward at their upper ends at $g$, as shown. Said arms $f$ $f$ are preferably flat and are united at their lower ends by an integral cross-piece $h$, which is flat on its bottom and bears upon the upper surface of the base $a$. The said cross-piece $h$ is provided with a vertical spindle $i$ of the proper size, which passes through the upper portion of the base $a$, as shown, and works within the cross-piece B to any desired depth. Each arm $f$ $f$ of the body portion is provided with a slot $j$ therein, which slot terminates at a point about midway of the height of each arm. The said slot does not extend to the top of each arm, but instead is merged into a recess $k$ at the curved portion $g$, as is clearly illustrated.

The roller $c$ may be of any construction and made of any desirable material. It is, however, preferably provided with flanges $l$ to center the gate therein. The roller $c$ is mounted on or is formed integral with an axle, which is of sufficient length to extend slightly to each side of the arms $ff$ when in position, and thereby be prevented from being removed vertically and yet be capable of being inserted in position in the slots $j$ by being introduced therein in an inclined position, as will be understood.

The parts being assembled as described and illustrated, the lower slat or bar D of the gate is mounted upon the roller $c$, and the gate can then be rolled back and forth to disclose and close any desired portion of the opening, or be swung entirely around to disclose the entire opening, as is done with other gate-hangers of this type, the latter operation being preferably effected after the gate has been rolled back far enough to balance on the roller.

What I claim is—

1. An improved gate hanger, comprising the base $a$ provided with parallel legs $d, d$; the body portion $b$, provided with vertical arms $f, f$, parallel for the greater part of their length, and curving outwardly at their upper ends; a slot $j$ in the main portion of each arm $f$; a recess $k$ above said slot in the curved portion of each arm; a roller $c$ mounted on an axle $l$ bearing in said slots; and a spindle $i$ on the body portion $b$ engaging with the base $a$, substantially as set forth.

2. An improved gate hanger, comprising the base $a$ provided with parallel legs $d, d$; the body portion $b$, provided with vertical arms $f, f$, parallel for the greater part of their length, and curving outwardly at their upper ends; a slot $j$ in the main portion of each arm $f$, a recess $k$ above said slot in the curved portion of each arm; a roller $c$ mounted on an axle $l$ bearing in said slots, said axle extending on each side of the arms $f, f$, for the purpose mentioned, substantially as set forth.

In testimony whereof I affix my signature in presence of two witnesses.

ANDREW MUNGER.

Witnesses:
GEO. L. PULLEN,
ROBT. D. HARTLEY.